US007812891B2

(12) United States Patent
Maruta

(10) Patent No.: US 7,812,891 B2

(45) Date of Patent: Oct. 12, 2010

(54) PANEL DISPLAY TYPE TELEVISION AND CABINET STRUCTURE

(75) Inventor: Naoto Maruta, Osaka (JP)

(73) Assignee: Funai Electric Co., Ltd., Daito-shi, Osaka (JP)

(*) Notice: Subject to any disclaimer, the term of this patent is extended or adjusted under 35 U.S.C. 154(b) by 1213 days.

(21) Appl. No.: 11/405,297

(22) Filed: Apr. 17, 2006

(65) Prior Publication Data

US 2006/0238663 A1 Oct. 26, 2006

(30) Foreign Application Priority Data

Apr. 26, 2005 (JP) ......................... 2005-002631 U

(51) Int. Cl.
*H04N 5/64* (2006.01)

(52) U.S. Cl. ....................... 348/794; 348/836; 348/789; 348/785; 348/787; 312/7.2

(58) Field of Classification Search ................. 348/794, 348/787, 789, 785, 836, 839, 843; 312/7.2, 312/249.1; 361/724, 727; 248/917, 918, 248/919

See application file for complete search history.

(56) References Cited

U.S. PATENT DOCUMENTS 6,377,320 B1 * 4/2002 Ananian et al. ............. 348/836
6,536,855 B2 * 3/2003 Maruta ....................... 312/7.2
7,477,328 B2 * 1/2009 Maruta ....................... 348/797
7,529,082 B2 * 5/2009 Maruta ....................... 312/7.2

FOREIGN PATENT DOCUMENTS

| | | |
|---|---|---|
| DE | 19544736 A | 6/1997 |
| JP | 56-94083 U | 7/1981 |
| JP | 58-042869 | 3/1983 |
| JP | 60-056087 | 4/1985 |
| JP | 10-041651 | 2/1998 |
| JP | 2001-145046 | 5/2001 |
| JP | 2003-140117 | 5/2003 |

OTHER PUBLICATIONS

French preliminary search report, dated Nov. 19, 2008.

* cited by examiner

*Primary Examiner*—David L Ometz
*Assistant Examiner*—Jean W Désir
(74) *Attorney, Agent, or Firm*—Yokoi & Co., U.S.A., Inc.; Toshiyuki Yokoi

(57) ABSTRACT

Front cabinets of different sizes have been prepared for each of display apparatuses of different screen sizes. A front cabinet 20 of a size capable of accommodating each of a PDP 31 and a PDP 32 of different screen sizes is provided and it is made possible to select, depending on whether the display accommodated therein is the PDP 31 or the PDP 32, one of a decoration frame 11 whose size of opening corresponds to a screen 31*a* of the PDP 31 and a decoration frame 12 whose size of opening corresponds to a screen 32*a* of the PDP 32 is selected and attached to the front cabinet 20. Therefore, one type of front cabinet 20 can be used in each of the cases where the PDP 31 or the PDP 32 is accommodated therein. Thus, the cost for manufacturing plasma televisions of different screen sizes can be reduced.

12 Claims, 6 Drawing Sheets

11
11a
11b
11b
11c
11d
11d
11e
Upper side
Lower side 20
21
20e
21b
Upper side
Lower side

PANEL DISPLAY TYPE TELEVISION AND CABINET STRUCTURE

The entire disclosure of Japanese Utility Model Application No. 2005-2631, filed Apr. 26, 2005, is expressly incorporated by reference herein.

BACKGROUND OF THE INVENTION

1. Field of the Invention

The present invention relates to a panel display type television provided with a front cabinet for accommodating a display unit and a decoration frame attached to the front cabinet for encircling the peripheral edge of the screen of the display apparatus and relates to the cabinet structure thereof.

2. Description of the Related Art

There has so far been known a cabinet for video equipment provided with a detachable frame member whereby the screen size can be varied (refer to Japanese Patent Unexamined Publication No. 2001-145046).

As another device, there is known a lid structure which, by folding a hinge portion provided at the circumference of a back lid, the size of the back lid itself can be varied so as to be adjusted to the size of an enclosure (Japanese Utility Model Unexamined Publication S56-94083).

However, in the above described art, it is only arranged such that a single frame member is detachable in order that the screen size of a CRT accommodated in the front cabinet is varied between an aspect ratio of 4:3 and an aspect ratio of 16:9. Therefore, the devices of such art were unable to comply with the demands in such a case where plural kinds of display apparatuses having originally different screen sizes are to be accommodated.

Further, in the case where front cabinets and frame members are each mass-produced by resin molding, it sometimes occurs, due to delicate dimensional errors between molded products on account of irregularities in degree of shrinkage following the molding process of the resin used as the materials, that externally observable misalignments or gaps are produced, when a frame member is attached on to a front cabinet, between the peripheral edge portion of the frame and the front cabinet. According as the size of liquid crystal displays and plasma television are enlarged in these years, such externally observable misalignments or gaps have become larger and nonnegligible.

However, since existence of such delicate dimensional errors has not been taken into consideration in the prior art design, the problem of gap and the like to be produced between the front cabinet and the frame member due to such dimensional errors has been left unsolved.

SUMMARY

Therefore, the present invention has been made to overcome the above mentioned problems and it is an object of the present invention to provide a panel display type television and a cabinet structure formed of a low cost configuration, capable of accommodating display apparatuses of different screen sizes in a manner best suited to each screen size, and capable of eliminating defective appearance on account of misalignments and gaps caused by delicate dimensional errors between each molded products.

The present invention, in order to achieve the above mentioned object, has a cabinet structure including a front cabinet, which has an opening provided in the front face thereof and accommodates a display apparatus, and a decoration frame, which is attached to the front side of the front cabinet and covers the peripheral edge of the screen of the display apparatus, and in this cabinet structure, the front cabinet is formed into a size capable of accommodating each of display apparatuses having different screen sizes and is provided with a decoration frame mounting portion, whereby each of decoration frames whose openings formed by the frame are made different in size corresponding to the different screen sizes can be mounted thereon.

In the present invention arranged as described above, the front cabinet is formed into a size capable of accommodating each of the display apparatuses having different screen sizes. Further, the front cabinet has a decoration frame mounting portion capable of mounting thereon each of the decoration frames whose openings formed by the frame are made different corresponding to the different screen sizes.

Thus, according to the present invention, in each of cases where the display apparatuses with different screen sizes are accommodated in one type of front cabinets, each screen of the accommodated display apparatus with a most suitable screen size can be exposed to the outside by selecting a decoration frame corresponding to the screen size of the accommodated display apparatus. Accordingly, the need for changing the size of the front cabinet for each of accommodated display apparatuses can be eliminated.

In another embodiment of the present invention, the above cabinet structure may be modified such that each decoration frame has an eave at the edge of the frame thereof on the side away from the screen in the state where the decoration frame is attached to the front cabinet, as extended to the side away from the screen.

In each of mass-produced front cabinets and decoration frames, delicate dimensional errors are liable to be produced. Hence, when a decoration frame is attached to the front face of a front cabinet, the peripheral edge of the frame sometimes deviates from the originally intended position on the front face and, thereby, a gap is produced between the parts due to the deviation. Then, by the provision of the eave at the edge of the decoration frame as extended outwardly as described above, the gap, if any, can be covered by the eave to be hidden from the eye of the user, so that deterioration of the product can be prevented.

As a more specific exemplary embodiment of the cabinet structure, bosses with a screw hole made therein may be disposed at a plurality of positions on the surface of each decoration frame opposing the front cabinet and the above mentioned decoration frame mounting portion may be constituted of the above mentioned bosses and through holes formed in the front cabinet at the positions corresponding to the bosses.

More specifically, by providing the screw holes on the side of the decoration frame and providing the through holes on the side of the front cabinet, both the members can be fixed together by screwing through the screw hole and the through hole.

Here, the above mentioned through hole can be formed into an elongated hole shape elongated in a specific direction in which the decoration frame largely deforms by shrinkage. The dimensional errors occurring in the decoration frame and the like are in most cases attributed to the difference in rate of shrinkage after thermal molding of resin materials. Therefore, if the through hole is made into an elongated shape along the direction in which the decoration frame greatly deforms by the shrinkage, the decoration frame can be easily fixed to the front cabinet even if the position of the above mentioned boss on the decoration frame with respect to the front cabinet is somewhat deviated from the originally intended position.

When a decoration frame in a substantially rectangular shape is manufactured by molding of a resin material, it occurs more frequently that the shrinkage after the thermal molding in the direction of the long side becomes greater than that in the short side. Therefore, the above referred specific direction may be defined as the longitudinal direction of the decoration frame molded into a substantially rectangular shape. As the result of making such a configuration, even when a decoration frame having a certain dimensional error in its longitudinal direction is attached to a front cabinet, the attachment can be easily performed by virtue of existence of the through holes in an elongated-hole shape.

As a further specific exemplary embodiment of the cabinet structure, such a configuration may be made in which the positioning members are disposed substantially in the center of both of the long sides of the decoration frame and on the face opposing the front cabinet, as held at a distance equal to the width of the opening in the direction of the short side of the front cabinet.

Each decoration frame has an opening whose size is different from one another, whereas the front cabinet to which each decoration frame is to be fixed has equal shape and size. Then, positioning members are disposed on the two long sides of the four sides constituting a decoration frame at a distance equal to the width of the opening along the short side of the front cabinet. As a result, the decoration frame can be correctly positioned with respect to the front cabinet regardless of the size of the opening of the decoration frame. Further, since the positions around the center of the two long sides of the decoration frame are where the shrinkage after the molding minimally occurs, by disposing the positioning members in such positions, it is made possible to bring the front cabinet and the decoration frame into correct alignment so as to be fixed together.

As specific examples of the above described display apparatuses, such panel type displays as large-sized liquid crystal panels and plasma display panels (PDP) can be considered.

On the basis of the above described configurations, the present invention can also be configured, in a panel display type television comprising a front cabinet provided with an opening in a front face thereof and accommodating a display apparatus and a decoration frame attached to the front side of the front cabinet and covering a peripheral edge of a screen of the display apparatus, such that the front cabinet is formed to have a size capable of accommodating each of large-sized panel type displays having different screen sizes, and each of the decoration frames is adapted to be attached to the front cabinet by provision of bosses having a screw hole made therein erected at plural positions on a face, opposite to the front cabinet, of each of the decoration frames, having different sizes of openings in their frames correspondently to the different sizes of screens, and by provision of through holes in an elongated shape elongated in a longitudinal direction of the decoration frame disposed on the front cabinet at positions respectively corresponding to the bosses, and each of the decoration frame has an eave at an edge of its frame facing away from an outer side of the screen in a state thereof being attached to the front cabinet, the eave being extended away from the outer side, and each decoration frame has positioning members disposed substantially in the center of each long side of a face thereof opposing the front cabinet and held at a distance equal to the width along the short side of the opening of the front cabinet.

In such a more particular configuration, similar functions to those in the above mentioned inventions can of course be performed.

According to the present invention as described above, when display apparatuses having different screen sizes are each accommodated in a front cabinets of an equal size with each other, a decoration frame having an opening suited to the screen size of each display apparatus can be appropriately fixed to the front cabinet. Therefore, the need for producing a front cabinet having different size for each of the display apparatus can be eliminated and the manufacturing cost of the cabinets can be greatly reduced.

Further, even when there are produced dimensional errors in the decoration frame and the front cabinet due to different degrees of shrinkage after the molding, the decoration frame can be appropriately fixed to the front cabinet, and, moreover, it is enabled to make misalignments or gaps between both of the molded products due to such dimensional errors hardly seen by the users.

DESCRIPTION OF THE PREFERRED EMBODIMENTS

An embodiment of the present invention will be described with reference to the accompanying drawings.

Figure 1:
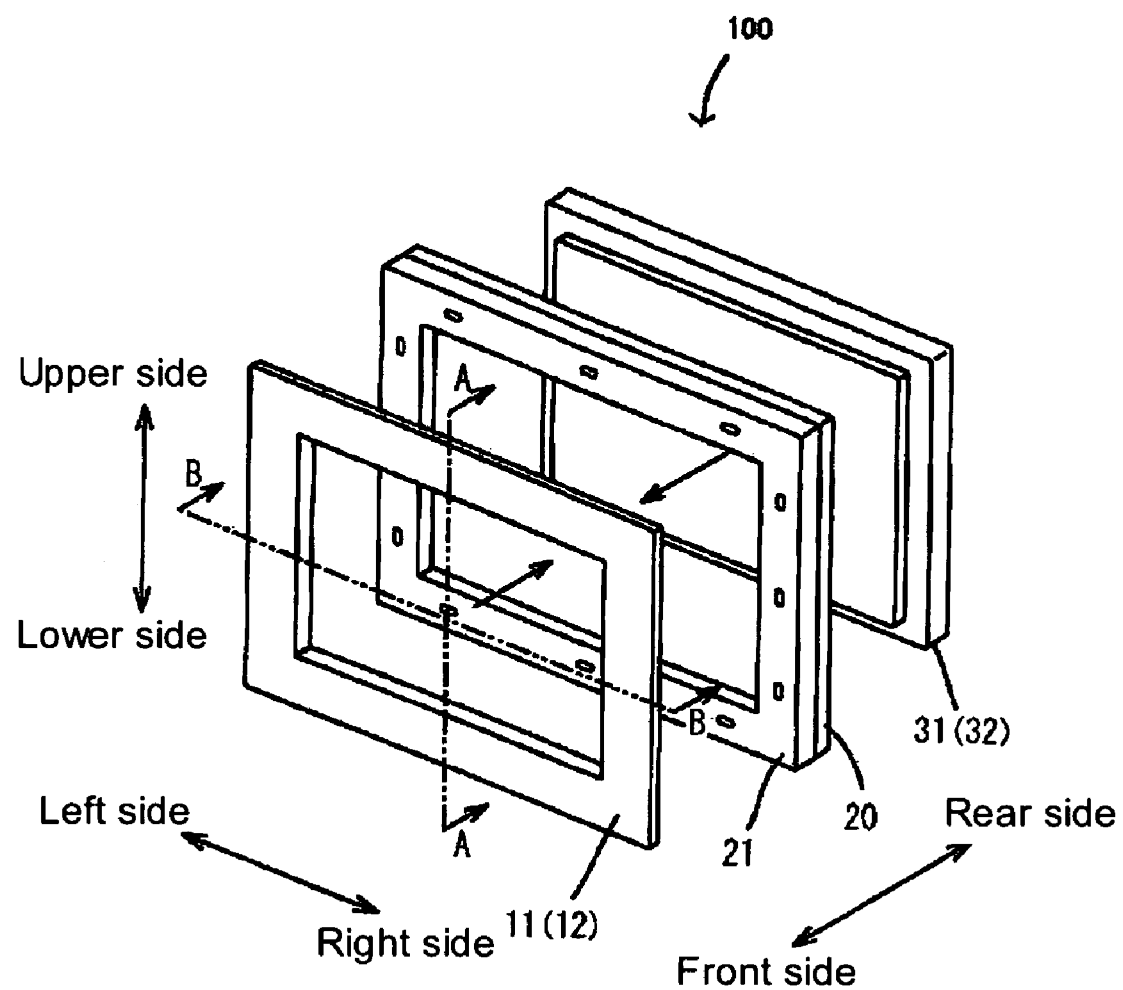
FIG. 1 is a perspective view showing a state of constructing a plasma television.

FIG. 1 is a drawing showing in perspective a state of constructing a plasma television 100.

Referring to the drawing, there are schematically shown, in the order from the front side to the rear side, a decoration frame 11 (or a decoration frame 12), a front cabinet 20, and a PDP 31 (or a PDP 32). The PDP 31 (32), provided on its rear side with circuits for video and audio outputs, not shown, is accommodated in a television cabinet the whole body thereof being substantially formed of front cabinet 20 and a rear cabinet, not shown, and fixed in place. Thus, a television as a product is constructed. The decoration frame 11 (12) is attached to the front side of the front cabinet 20 to thereby constitute a portion of the television cabinet.

The decoration frame 11 (12) and the front cabinet 20 are each formed to have a landscaped, substantially rectangular shape and has an opening for allowing the screen of the PDP 31 (32) to be exposed to the outside. Hereinafter, the upper, lower, left, and right edge portions constituting the front side 21 of the front cabinet 20 may, according to circumstances, be called the upper edge, lower edge, left edge, and right edge, respectively, and the upper, lower, left, and right sides of the decoration frame 11 (12) may, according to circumstances, be called the upper, lower, left, and right sides, respectively. Although a cabinet structure of the present invention will be described below by taking a cabinet for a plasma television as an example, it is needless to say that the cabinet structure of the present invention is also applicable to display apparatuses of other panel types, such as liquid crystal monitors.

The decoration frame 11 (12) and the front cabinet 20 are mass-produced by molding with use of resin materials specified for each of them.

Figure 2:
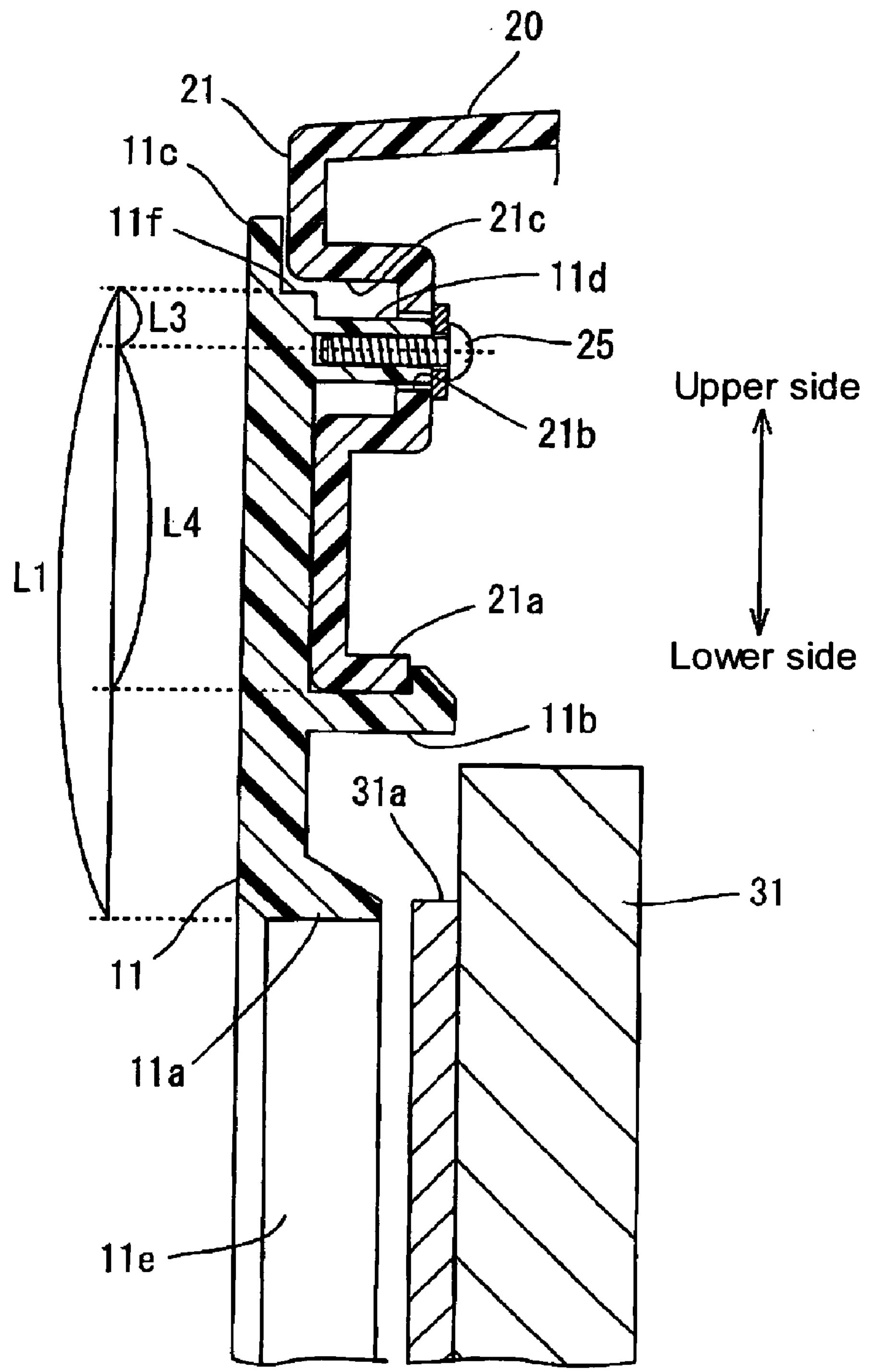
FIG. 2 is a partially sectional vertical view of a plasma television.
Figure 3:
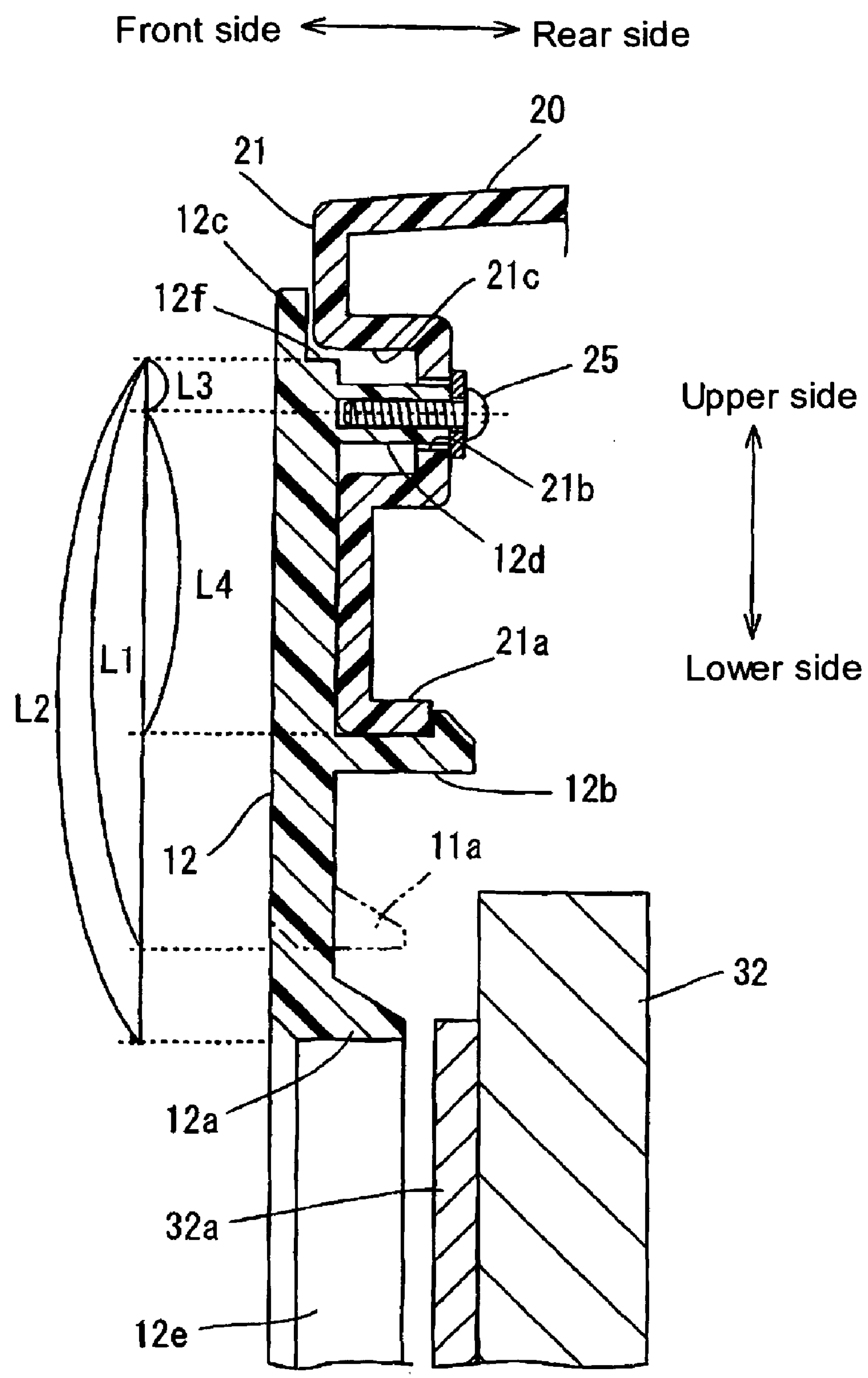
FIG. 3 is a partially sectional vertical view of a plasma television.

FIG. 2 and FIG. 3 show a portion of the plasma television 100 in cross-section taken along the line A-A in FIG. 1. The drawings are made centering around the upper edge of the front cabinet 20, the upper side of the decoration frame attached to the same, and a portion of the PDP. The lower side is of a vertically symmetrical structure with the upper side.

Both the drawings are alike in that they are using the front cabinet 20 of the same type but are different in that they are using different types of the PDP and decoration frame. In FIG. 2, a PDP 31 of a predetermined screen size is accommodated within the front cabinet 20 and fixed in place by a fixing member, not shown, whereas in FIG. 3, a PDP 32 having a smaller screen size than the PDP 31 (for example 1 inch smaller) is accommodated within the front cabinet 20 and fixed in place with a fixing member, not shown.

More specifically, the front cabinet 20 is formed to have a size with a certain level of margin so as to be able to accommodate PDPs having mutually different sizes.

Now, the decoration frame will be described. In the present invention, a decoration frame whose size of opening is best suited to the screen size of the PDP accommodated in the front cabinet 20 is selected to be attached to the same. More concretely, when a PDP 31 is fixed within the front cabinet 20, a decoration frame 11 having an opening whose size is substantially equal to the size of the screen 31*a* is attached to the front cabinet 20. On the other hand, when a PDP 32 is fixed within the front cabinet 20, a decoration frame 12 having an opening whose size is substantially equal to the size of the screen 32*a* is attached to the front cabinet 20.

The way of attaching a decoration frame will be described now. Incidentally, the ways of attaching the decoration frame 11 and 12 are equal with each other, and therefore the description will be made here with the decoration frame 11 taken as an example.

Figure 5:
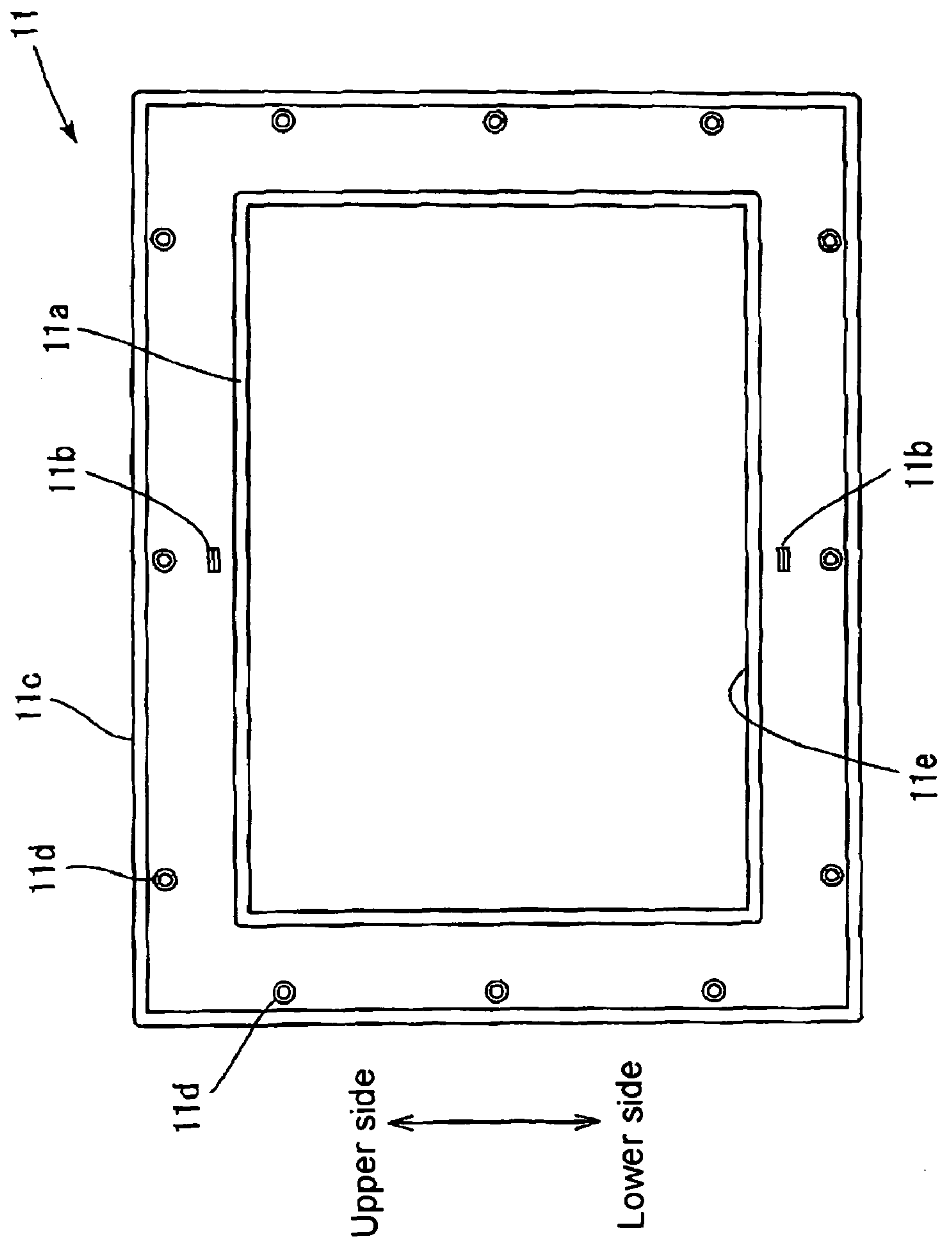
FIG. 5 is a rear view of a decoration frame.
Figure 6:
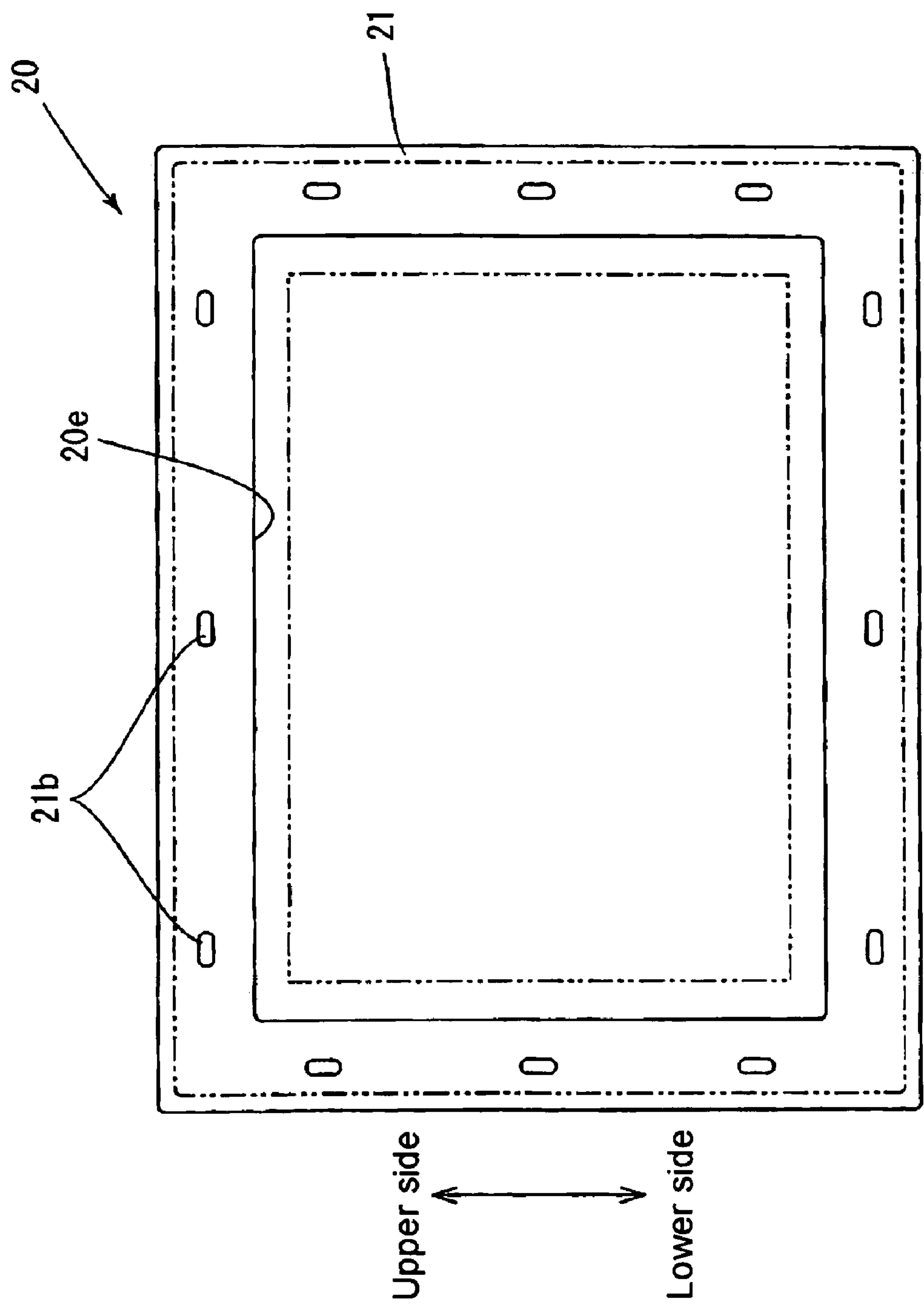
FIG. 6 is a front view of a front cabinet.

FIG. 5 is a drawing schematically showing the rear side of the decoration frame 11, while FIG. 6 is a drawing schematically indicating the front side of the front cabinet 20 with solid lines.

The decoration frame 11 has an opening 11*e* in its center portion and has bosses 11*d* in several points on its rear side as embossed toward the rear side. The hole made in each boss 11*d* is a screw hole. Substantially in the centers of the upper side and the lower side of the rear side of the decoration frame 11, there are provided temporarily fixing members (positioning members) 11*b* as projected toward the rear side.

At the tip end of the temporarily fixing member 11*b* on the upper side, there is provided a projection which is turned upward, whereby the member and the projection as a whole has substantially a hook shape. Likewise, at the tip end of the temporarily fixing member 11*b* on the lower side, there is provided a projection which is turned downward, whereby the member and the projection as a whole has substantially a hook shape.

The upper and lower temporarily fixing members 11*b* are disposed on the upper side and the lower side, respectively, as held at a distance equal to the distance between the upper and lower edges of the front cabinet 20 lying toward inside the screen, or in other words, at a distance equal to the width of the opening 11*e* of the front cabinet 20 along the vertical direction.

Of the decoration frame 12 shown in FIG. 3, the size of the outer periphery of the entire frame, the shapes and positions of the bosses, and the shapes and positions of the temporarily fixing members are the same as those of the decoration frame 11. However, in order to reduce the size of its opening, the widths of the upper, lower, left, and right sides are made larger than those of the decoration frame 11. Namely, if comparison is made with the upper side taken as an example, when, as shown in FIG. 2 and FIG. 3, the distance from the edge 11*f* facing outward to the edge 11*a* facing inward of the decoration frame 11 is denoted by L1 and when the distance from the edge 12*f* facing outward to the edge 12*a* facing inward of the decoration frame 12 is denoted by L2, a relationship expressed by L1<L2 holds. On the other hand, the distance from the edge 11*f* to the boss 11*d* and the distance from the edge 12*f* to the boss 12*d* are equally L3 for both decoration frames. Also, the distance from the edge 11*f* to the temporarily fixing member 11*b* and the distance from the edge 12*f* to the temporarily fixing member 12*b* are equally L4 for both decoration frames.

In the front cabinet 20, there is provided an opening 20*e* in the center of the front side 21 and there are provided through holes 21*b* in an elongated shape in left to right (longitudinal) direction in several positions. The opening 20*e* is formed to be larger than each of the decoration frames 11 and 12. Each through hole 21*b* is disposed in the corresponding position to each boss 11*d* when the decoration frame 11 is attached thereto.

With the members structured as described above, the rear face of the decoration frame 11 is brought close to the front face 21 of the front cabinet 20 and, at the same time, the two temporarily fixing members 11*b* are allowed to pass through the opening 20*e* of the front cabinet 20, and then the projections at the tip end of the temporarily fixing members 11*b* are brought into hooked engagement with the upper edge 21*a* and the lower edge 21*a* of the front cabinet 20 substantially at their center positions. As a result, a portion of the rear side of the decoration frame 11 and a portion of the front side 21 are brought into abutment and, thus, the decoration frame 11 is temporarily fixed to the front cabinet 20. At this time, each of bosses 11*d* is held inserted into each of corresponding through holes 21*b*.

At the time when the temporarily fixing members 11*b* are brought into hooked engagement with the upper edge and the lower edge of the front cabinet 20, the work can be easily performed if the decoration frame 11 is slightly bent. Further, on the side of the front cabinet 20, markings or small grooves for indicating the positions where the temporarily fixing members 11*b* are brought into their hooked state are made in substantially central positions of the upper edge 21*a* and the lower edge 21*a*. As a result, the center position of the decoration frame 11 and the center position of the front side 21 can be brought into accurate alignment.

If the temporarily fixed state as described above is attained, then, as shown in FIG. 2, a screw 25 is screwed into the screw hole in each of the bosses 11*d*, whereby the decoration frame 11 is fixed by screw to the front cabinet 20. As a result, the decoration frame 11 and the front cabinet 20 are securely fixed together.

As the result of the above described fixing work, the position of the opening 11*e* of the decoration frame 11 and the position of the screen 31*a* are brought substantially into agreement as shown in FIG. 2, so that the screen 31*a* can be brought into its suitably exposed position to the outside. In FIG. 6, the outer periphery of the decoration frame 11 attached to the front side 21 as above is indicated with the two-dot chain line on the outer side and the size of the opening 11*e* is indicated with the two-dot chain line on the inner side.

On the other hand, when the decoration frame 12 is attached to the front cabinet 20 following similar steps to the above, the front side of the front cabinet 20 is covered more greatly than when the decoration frame 11 is used as shown in FIG. 3, so that the position of the opening 12*e* of the decoration frame 12 comes to substantially agree with the position of the screen 32*a* and, thereby, the screen 32*a* is allowed to be suitably exposed to the outside. When the decoration frame 12 is attached, its outer periphery comes essentially into agreement with the outer two-dot chain line shown in FIG. 6. However, the size of the opening 12*e* is made further smaller than the range surrounded by the inner two-dot chain line in FIG. 6.

Further, in the present invention, there is provided an eave portion 11*c* or 12*c* extended outwardly from an edge 11*f* or 12*f* on the side away from the screen of the decoration frame 11 or 12. Functioning of the eave portion will be described below. Since functioning of the eve portions of decoration frames is alike, the description will be made with the case of the eave portion 11*c* formed on decoration frame 11 taken as an example.

Figure 4:
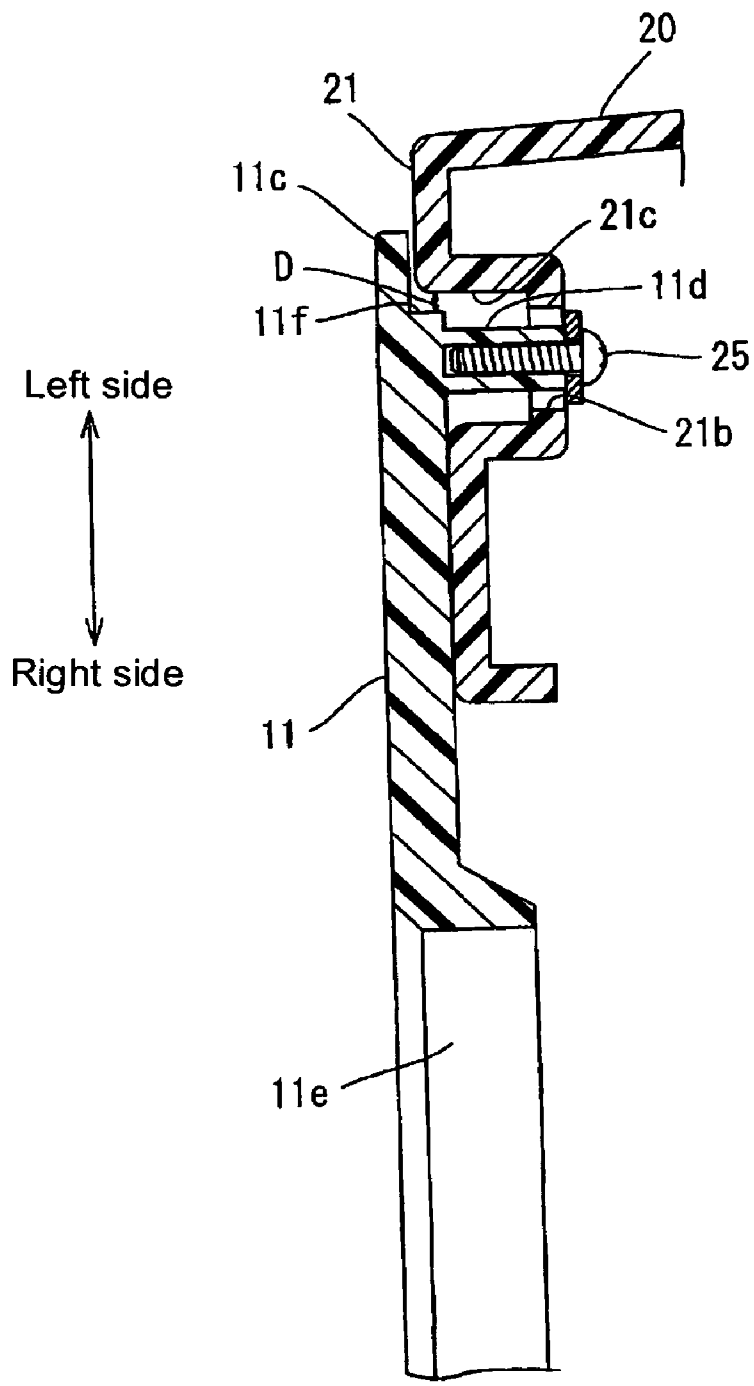
FIG. 4 is a partially sectional lateral view of a plasma television.

FIG. 4 shows a plasma television 100, partly in cross-section taken along the line B-B in FIG. 1. FIG. 4 is drawn centering around the left edge of the front cabinet 20 and the left side of the decoration frame 11 attached thereto. There is omitted the PDP 31. Incidentally, the structure on the right edge side is in a mirror-image relation to the structure on the left edge side.

Also in FIG. 4, the same as in FIG. 2, with a part of the rear face of the decoration frame 11 and a part of the front face 21 of the front cabinet 20 put into abutment, the front cabinet 20 and the decoration frame 11 are clamped together by having a screw passed through the boss 11*d* and the through hole 21*b*.

As shown in FIG. 4, there is formed a gap D between the edge 11*f* on the side of the decoration frame 11 and the wall face of a recess 21*c* formed on the side of the front cabinet 20. The recess 21*c* is a dent having the through hole 21*b* formed at its bottom and it serves as a guide for introducing the boss 11*d* when the decoration frame 11 is fixed. As described above, the outer periphery of the front cabinet 20 and that of the decoration frame 11, 12 are each of a fixed size. Therefore, if most suitable molds to be used in molding work have been determined at the time of designing by taking into consideration also the shrinkage, during cooling after the molding, of the outer peripheries of the front cabinet 20 and the decoration frame 11, 12, there will be produced no such gap D as described above.

However, when front cabinets 20 and decoration frames 11, 12 are actually mass-produced by molding work of plastic materials, delicate dimensional errors from product to product come to occur due to difference in the rates of shrinkage of the materials or how the cooling periods are taken. Because of existence of such dimensional errors, when the decoration frame 11, 12 is attached to the front cabinet 20, it sometimes occurs that the edge 11*f* and the wall face of the recess 21*c* become unable to be brought into accurate abutment and, as a result, such a gap D as described above is produced. Hence, the eave 11*c* is provided as outwardly extended from the edge 11*f*. Thus, even when there is produced such a gap D as described above, the gap D is covered from the front side by the eave 11*c* and therefore it is made possible to keep the gap D unseen by users.

The present invention is favorably applicable to a cabinet structure accommodating a large sized panel type display as large in screen size as 25 inch or larger.

From the cabinet accommodating a large-sized panel type display, high strength is demanded because of the large-size design. Further, the decoration frame has a role, in addition to the role of suitably covering the screen according to the screen size on the front side of the front cabinet 20, to reinforce the strength of the cabinet from the front side. In view of such demand for reinforcement, a plastic material, different from that for the front cabinet 20, is used in the present invention for decoration frame 11, 12. (For example, while ABS resin is used for the front cabinet 20, polica ABS resin stronger than ABS resin is used for the decoration frame 11, 12.)

Because the front cabinet 20 and the decoration frame 11, 12 are made of different materials, the rate of shrinkage of the materials when cooled down after molding work differ and as a result the above described gap D tends to occur. Further, in the process of mass-production of the front cabinets 20 and decoration frames 11, 12, sometimes sufficient cooling period cannot be taken for each molded product. Such circumstances also cause the dimensional errors to occur from product to product.

Under the conditions where there are present such causes of occurrence of dimensional errors, the present invention has succeeded in removing the defect in appearance of the cabinet by further providing eaves for the outer edges of the decoration frame 11, 12 and, in addition, in securing the strength and attaining speed up by mass-production of the cabinets.

The dimensional errors of the front cabinet 20 and the decoration frame 11, 12 chiefly occur in their longitudinal direction. This is due to the fact that when molten resin is filled into molds for molding the front cabinet 20 or the decoration frame 11, 12, the molten resin is pushed to flow from the center of the mold to both sides in the longitudinal direction of the mold and, hence, the shrinkage becomes remarkable in the longitudinal direction. Therefore, in the present invention as described above, it is designed such that the temporarily fixing member 11*b*, 12*b* are provided substantially in the center of the upper side and the lower side, as longer sides, of the decoration frame 11, 12 and the above described through hole 21*b* is formed so as to be elongated in the longitudinal direction of the front cabinet 20.

More specifically, positions around center of the upper side and the lower side of the decoration frame 11, 12 are where dimensional errors due to shrinkage rarely occur. Therefore, the temporarily fixing member 11*b*, 12*b* can be steadily secured around the center of the upper side and the lower side of the decoration frame 11, 12. As a result, by virtue of the use of the temporarily fixing member 11*b*, 12*b*, the center of the decoration frame 11, 12 and the front cabinet 20 can be temporarily secured in accurate alignment and users are prevented from having uncomfortable feeling about the appearance. Further since the through hole 21*b* is elongated in the longitudinal direction, each boss 11*d*, 12*d* can be easily inserted into the through holes 21*b* even if the decoration frame 11, 12 and the front cabinet 20 have certain dimensional errors and thus the decoration frame 11, 12 and the front cabinet 20 can be securely fixed together.

According to the present invention, as described above, there is provided a front cabinet 20 of a size capable of accommodating each of a PDP 31 and a PDP 32 having different screen sizes and either a decoration frame 11 having its opening correspondent to the screen 31*a* of the PDP 31 or a decoration frame 12 having its opening correspondent to the screen 32*a* of the PDP 32 is adapted to be selectively attached to the front cabinet 20 according to whether the display to be accommodated therein is the PDP 31 or the PDP 32. Therefore, one size of front cabinet 20 can be used whether the PDP 31 or the PDP 32 is to be accommodated therein, and thus the manufacturing cost of plasma televisions having different screen sizes can be reduced.

In addition, an eave is provided at the outer edge of the decoration frame 11, 12. Therefore, even if a gap is produced at the peripheral edge of the decoration frame 11, 12 on the front side by misalignment between the parts due to dimensional errors of the decoration frame 11, 12 and the front cabinet 20, the gap can be covered by the eave so that users are prevented from having uncomfortable feeling about the appearance.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A panel display type television comprising:

a front cabinet provided with an opening in a front face thereof and accommodating a display apparatus; and a decoration frame attached to the front face of said front cabinet and covering a peripheral edge of a screen of said display apparatus, wherein said front cabinet is formed to have a size capable of accommodating each of large-sized panel type displays having different screen sizes, and each of said decoration frames is adapted to be attached to said front cabinet by provision of bosses having a screw hole made therein erected at plural positions on a face, opposite to said front cabinet, of each of said decoration frames, having different sizes of openings in their frames correspondently to the different sizes of screens, and by provision of through holes in an elongated shape elongated in a longitudinal direction of said decoration frame disposed on said front cabinet at positions respectively corresponding to the bosses, and wherein each of said decoration frame has an eave at an edge of its frame facing away from an outer side of the screen in a state thereof being attached to said front cabinet, said eave being extended away from the outer side, and each decoration frame has positioning members disposed substantially in the center of each long side of a face thereof opposing said front cabinet and held at a distance equal to the width along the short side of the opening of said front cabinet.

2. A cabinet structure comprising:

a front cabinet provided with an opening in a front face thereof and accommodating a display apparatus; and a decoration frame attached to the front side said front cabinet and covering a peripheral edge of a screen of the display apparatus, wherein said front cabinet is formed to have a size capable of accommodating each of display apparatuses having different screen sizes and provided with a decoration frame mounting portion capable of mounting thereon each of decoration frames sizes of openings thereof formed by the frames being made different correspondently to the different screen sizes, and wherein each of said decoration frame has an eave at an edge of its frame facing away from an outer side of the screen in a state thereof being attached to said front cabinet, said eave being extended away from the outer side.

3. The cabinet structure according to claim 2, wherein bosses having a screw hole provided therein are erected at plural positions on a face opposite to said front cabinet and said decoration frame mounting portion is constituted of through holes disposed at positions of said front cabinet corresponding to said bosses.

4. The cabinet structure according to claim 3, wherein said through holes are formed in an elongated-hole shape elongated in a specific direction in which said decoration frame is liable to exhibit shrinking deformation.

5. The cabinet structure according to claim 4, wherein said specific direction is a longitudinal direction of said decoration frame in a substantially rectangular shape.

6. The cabinet structure according to claim 2, wherein a positioning member is disposed substantially at the center of each long side of said decoration frame on a face thereof opposing said front cabinet as held at a distance equal to the width of the opening in the direction of the short side of said front cabinet.

7. The cabinet structure according to claim 6, wherein said positioning members are disposed on upper side and lower side of said decoration frame as erected in a direction toward said front cabinet, one end thereof on the upper side is provided with an upwardly turned projection such that the member and the projection as a whole forms substantially a hook shape, the other end thereof on the lower side is provided with a downwardly turned projection such that the member and the projection as a whole forms substantially a hook shape, the positioning members except their end portions are held apart a distance equal to a width of the opening in its vertical direction of said front cabinet, and the arrangement of the end portions turned upward and downward allows said positioning members to be engaged with edges of said opening.

8. The cabinet structure according to claim 7, wherein said front cabinet is provided at its side substantially in the center along its width with a marking to indicate a position at which said positioning member is to be engaged therewith.

9. The cabinet structure according to claim 2, wherein an eave is disposed at an edge of said decoration frame facing away from an outer side of the screen as extended in the outward direction, said eave covering, from the front side, a gap produced between said decoration frame and said front cabinet so as to be unseen.

10. The cabinet structure according to claim 2, wherein said display apparatus is a large-sized panel type display.

11. The cabinet structure according to claim 10, wherein said display apparatus is a large-sized panel type display with a screen size of 25 inch or above.

12. The cabinet structure according to claim 11, wherein said decoration frame provides reinforcement of said front cabinet from its front side while suitably covering the screen according to its size at the front side of said front cabinet, and said front cabinet is made of ABS resin and said decoration frame is made of polica ABS resin having a higher strength than ABS resin.

* * * * *